July 1, 1952    J. J. SOLON    2,602,103
SELF-STARTING SYNCHRONOUS MOTOR
Filed Jan. 27, 1949
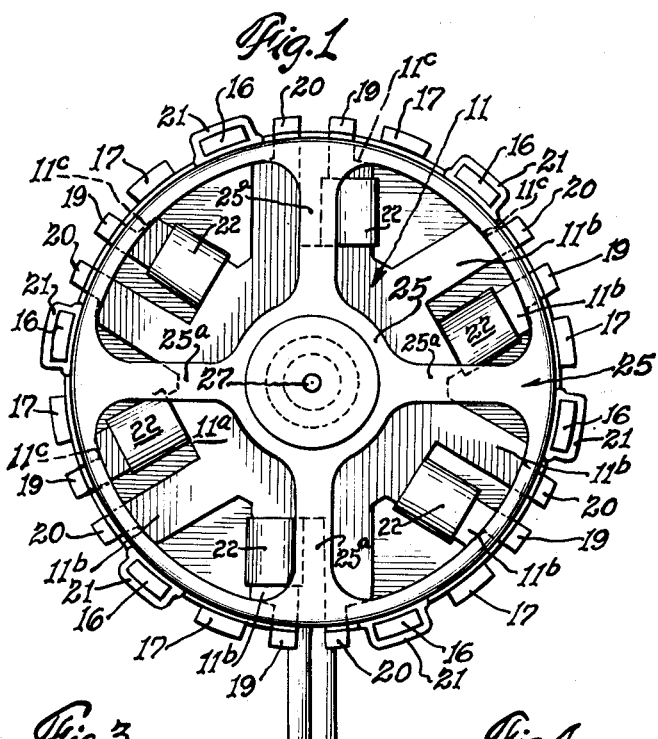
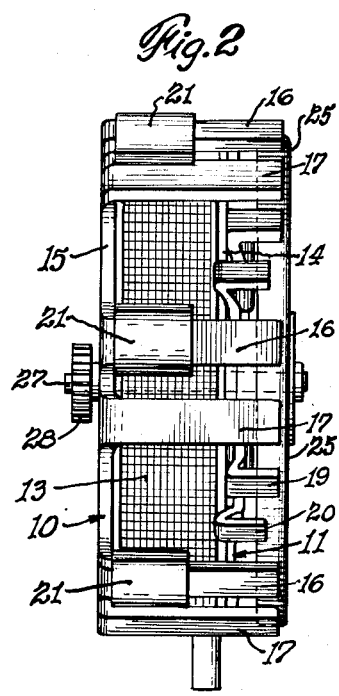
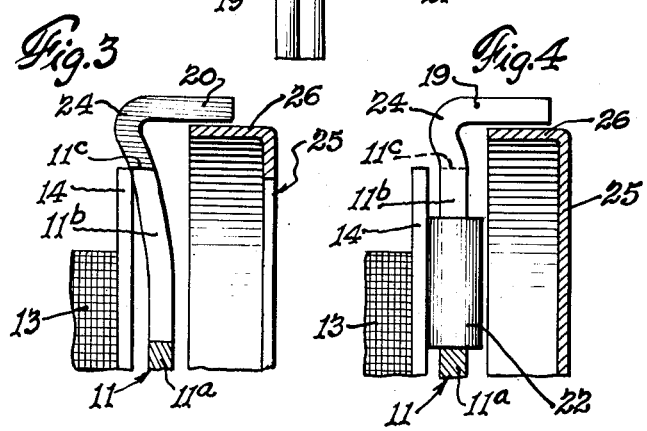
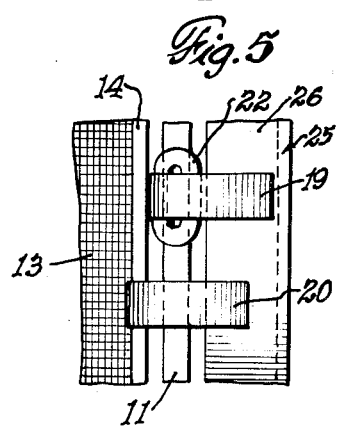
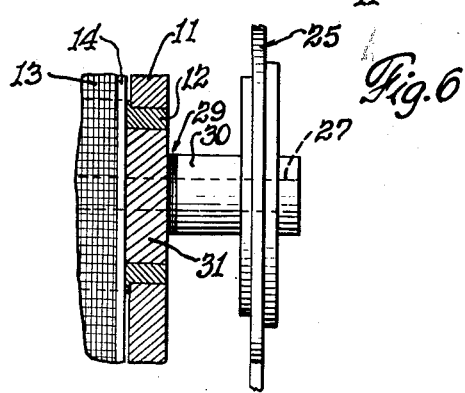
INVENTOR
Joseph J. Solon
By Frank Schraeder
Attorney Patented July 1, 1952

2,602,103

UNITED STATES PATENT OFFICE 2,602,103

SELF-STARTING SYNCHRONOUS MOTOR

Joseph J. Solon, Auburn, N. Y.

Application January 27, 1949, Serial No. 73,082

6 Claims. (Cl. 172—278)

The present invention relates particularly to small electric motors of an old and well known type that contains a central core of magnetic material surrounded by a field coil, parallel plates in the form of discs or spiders of magnetic material fixed upon the ends of the core, a rotor carried by a shaft extending axially through and revoluble in the core, and pole pieces projecting from the peripheries of the plates and arranged in spaced relation to each other in the form of a cylindrical shell that is coaxial with the core and surrounds the rotor.

Motors of the aforesaid type have not been sufficiently powerful to make them satisfactory in many of the situations where considerable power is required in a small motor; the voltage required to start such motors has been too high and, in many instances, the motors have not been reliable in starting; difficulty has been experienced in maintaining synchronous speeds of six hundred revolutions per minute; and the motors have not been as silent in operation as is desirable.

The object of the present invention is to overcome the above mentioned faults, in the general type of motor under consideration, by means of simple and unique changes in its construction.

The various features of novelty whereby the present invention is characterized will hereinafter be pointed out with particularity in the claims; but for a full understanding of the invention and of its objects and advantages, reference may be had to the following detailed description taken in connection with the accompanying drawing, wherein:

Figure 1 is a front view of a motor embodying the present invention; Fig. 2 is a side or edge view of the motor; Fig. 3 is a view on an enlarged scale of a fragment of the motor, being partly in elevation and partly as a section taken on a radial plane adjacent to one of the unshaded pole pieces at the front end of the motor; Fig. 4 is a view similar to Fig. 3, the plane of the section being adjacent to the shaded pole piece that is paired with the pole piece of Fig. 3; Fig. 5 is a side or edge elevation of the fragment of the motor illustrated in Figs. 3 and 4, showing both of the poles; and Fig. 6 is a view, partly in side elevation and partly in section, illustrating a novel feature in the bearing for the rotor.

Referring to the drawing, 10 and 11 are plates of magnetic material secured on the ends of a sleeve-like core 12, also of magnetic material, in any usual manner; Fig. 6 showing the connection between one end of the core and one of the plates, and there being a like connection between the other end of the core and the other plate. A field winding 13, disposed between discs 14 and 15 of insulating material, surrounds the core. Rear plate 10 is a disc that has twelve long pole pieces projecting forwardly, parallel to the axis of the motor, over the field winding and outwardly beyond the front plate 11; these pole pieces being arranged in pairs, 16 and 17, the pieces of each pair being spaced only a short distance apart, while the spacing between pairs is much greater. The front plate 11 comprises a central portion 11$^a$ from which radiate twelve fingers 11$^b$. These fingers are grouped in pairs and are bent forwardly to create short pole pieces or elements 19 and 20, arranged in pairs that alternate with and lie in the same cylindrical shell as the forward ends of the long pole pieces 16 and 17.

The central portion of the front plate may be of any desired diameter and the fingers may be of any desired lengths and widths so long as their outer ends can properly be positioned with respect to the long pole pieces. In the arrangement shown, the fingers begin not far from the center of the disc and are made wide at their inner or base ends and are narrowed abruptly to create shoulders 11$^c$ far enough from the long pole pieces to avoid any material magnetic flux from these shoulders to the long pole pieces. By this means the fingers are stiffened at their base ends and, furthermore, sleeve-like shading elements can be slipped on easily past the narrow pole pieces.

Each long pole piece 16 is surrounded by a metallic, non-magnetic shading sleeve 21, while each finger that terminates in a pole piece 19 is provided with a similar shading element 22. It will be seen that each unshaded pole piece in one set or group lies beside a shaded pole piece in the other set.

In prior motors it has been the practice to make simple right angled bends in the fingers or pole pieces to create the sections that occupy positions in the cylindrical shell adapted to surround the rotor element. I have discovered that greatly improved results are attained by not only bending each finger so as to cause the outer portion thereof to be disposed at right angles to the inner portion, but also providing at the angle a rearwardly bowed portion that may be an arc of one hundred and eighty degrees, as shown at 24 in Figs. 3 and 4.

I have further discovered that I am able to obtain additional, and even greater, improvement by offsetting the unshaded short pole pieces rearwardly a substantial distance relatively to the corresponding shaded pole pieces.

In a motor two inches in diameter the radius of the bowed portions 24 may be about one sixteenth inch, while the offset rearwardly of the unshaded short pole pieces should be about as great as this radius.

The rotor element for the motor consists of a light, four armed spider 25 surrounded by an annular flange or rim 26 that connects the outer ends of the arms together; the whole being formed from a single piece of hard steel. The annular flange 26, in a two inch motor, should have a width close to one eighth inch and the arms 25ᵃ of the spider should preferably be of about the same width as the rim or flange.

The rotor is fixed on one end of shaft 27 which extends through and is rotatable in the core 12, in the usual way. When a pinion 28 or other power transmitting device is secured to the shaft at the rear side of the motor the assembly is complete.

Motors of this general type have heretofore not been as silent, when running, as is desirable in most situations where they have been used. This is due to the magnification of the sound of the rotor revolving against the adjacent bearing block in the core. It has been the practice to place a steel washer between the rotor and the bearing block, but this has been only partially effective in reducing the noise. I have discovered that, as shown in Fig. 6, when a laminated washer 29, .005 inch thick, composed of phenolic resin, is placed between the hub 30 in the rotor and the bearing block 31 in the core member of the stator, the objectionable sounds are eliminated.

Commercial motors having an overall diameter of two inches, built according to the proportions of the parts heretofore stated, and as shown in the drawings, start at sixty five volts, instead of eighty five in the case of comparable prior motors, and thereafter maintain full synchronous speed. Offsetting the unshaded short pole pieces has the effect of increasing the starting torque as well as the synchronous torque. I have found that the one eighth inch width of the rotor flange or rim in these two-inch commercial motors is very important; the effectiveness of the motor decreasing rapidly as this flange width is increased or decreased to any substantial extent. In other words, the one eighth inch flange receives full flux saturation from the pole pieces, whereas a wider or a narrower flange does not. The combination of four arms in the spider and six pairs of poles in each set of pole pieces is an important factor in eliminating "dead center" positions of the rotor. Whenever any arm of the spider is in radial alignment with a pair of pole pieces in either set, the two arms on opposite sides thereof register with pole pieces in the other set; the arms of the spider thus providing a path for the magnetic lines of force between poles of different polarity in all angular positions of the rotor.

I claim:

1. In a synchronous motor, a field structure having two spaced, parallel plates of magnetic material, one plate being provided with a set of long, narrow pole pieces that extend from the periphery thereof forwardly to and past the second plate, the second plate having radial fingers that terminate in a set of short pole pieces which extend forwardly and form with the other set of pole pieces a short cylindrical shell, the pole pieces of each set being arranged in pairs that alternate with those of the other set, shading means including a shading element on each alternate finger, the unshaded fingers being bent backward to offset the corresponding pole pieces rearwardly with respect to the remaining short pole pieces, and a rotor of magnetic material provided with a peripheral annular flange surrounded by and lying near said cylindrical shell.

2. A synchronous motor as set forth in claim 1, wherein the outer portion of each finger is bent at an intermediate point therein to produce two sections at right angles to each other and joined to each other by a small rearwardly curved portion having an angular length of about 180°.

3. In a synchronous motor, a field structure containing two spaced, parallel plates of magnetic material one of which has a set of twelve long, narrow pole pieces extending from the periphery forwardly to and beyond the second plate while the latter has twelve radial fingers, said fingers terminating in a set of like, short pole pieces connected thereto by small rearwardly bowed elements and extending forwardly to form with the other pole pieces a short cylindrical shell, the pole pieces of each set being arranged in pairs that alternate with those of the other set, shading means including a shading element on each alternate finger, the unshaded fingers being bent backward to offset the corresponding pole pieces with respect to their companion pole pieces, and a rotor of magnetic material composed of a spider having four equally spaced arms connected together at their outer ends by a cylindrical annular flange surrounded by said shell and having a diameter only slightly smaller than that of the shell.

4. In a synchronous motor, a field structure that contains two spaced, parallel plates of magnetic material one of which has a set of long, narrow pole pieces that extend from the periphery to and forwardly beyond the second plate, radial fingers on the second plate terminating in a set of short, narrower pole pieces that extend forwardly from that plate and form with the other pole pieces a cylindrical shell, said short pole pieces being connected to the remaining portions of the fingers by small rearwardly bowed elements, the pole pieces of each set being arranged in pairs that alternate with those of the other set, shading means for said pole pieces including a shading element on each alternate finger, the unshaded fingers being bent back to offset the corresponding short pole pieces rearwardly with respect to the remainder of the short pole pieces a distance about equal to the width of one of such pole pieces, and a rotor of magnetic material having a peripheral, cylindrical flange surrounded by and near said cylindrical shell.

5. A synchronous motor as set forth in claim 4, wherein the width of the flange on the rotor is about twice as great as the amount of offset of the unshaded short pole pieces.

6. A pole member for a synchronous motor composed of a plate of magnetic material having projecting radial fingers arranged in pairs, the outer portions of the fingers being abruptly narrowed and bent at the middle to form forwardly projecting pole pieces forming a cylindrical shell and each joined to a radial part of the corresponding finger by a rearwardly bowed portion, and the extreme outer end of one finger of each pair being offset rearwardly with respect to the companion finger.

JOSEPH J. SOLON.

REFERENCES CITED

The following references are of record in the file of this patent:

UNITED STATES PATENTS

| Number | Name | Date |
|---|---|---|
| 2,292,265 | Carpenter | Aug. 4, 1942 |

FOREIGN PATENTS

| Number | Country | Date |
|---|---|---|
| 436,145 | Great Britain | Oct. 7, 1935 |